Nov. 3, 1964 S. LOEWE 3,155,334

MAGNETIC SOUND RECORDING AND REPRODUCING APPARATUS

Filed Jan. 22, 1962 3 Sheets-Sheet 1

Inventor:
Siegmund Loewe
by:
Michael S. Striker
Attorney

Nov. 3, 1964 S. LOEWE 3,155,334

MAGNETIC SOUND RECORDING AND REPRODUCING APPARATUS

Filed Jan. 22, 1962 3 Sheets-Sheet 2

Jnventor:
Siegmund Loewe
by:
Michael S. Striker
Attorney

Nov. 3, 1964 S. LOEWE 3,155,334

MAGNETIC SOUND RECORDING AND REPRODUCING APPARATUS

Filed Jan. 22, 1962 3 Sheets-Sheet 3

Jnventor:
Siegmund Loewe
by: Michael S. Striker
Attorney 3,155,334
Patented Nov. 3, 1964

3,155,334

MAGNETIC SOUND RECORDING AND REPRODUCING APPARATUS

Siegmund Loewe, 68 Ridge Road, Yonkers 5, N.Y.; Bernard Lowe, executor of said Siegmund Loewe, deceased Filed Jan. 22, 1962, Ser. No. 167,556
Claims priority, application Germany July 9, 1954
7 Claims. (Cl. 242—55.12)

The present invention relates to magnetic sound recording and reproducing apparatus in general, and more particularly to a carrier which supports a pair of tape reels when the reels are removed from the deck of the sound recording and reproducing apparatus.

This application is a continuation-in-part of my application Serial No. 520,087, filed July 5, 1955, now abandoned.

An important object of the invention is to provide a carrier which will non-rotatably and non-shiftably support a pair of tape reels in a common plane when the reels are lifted from the tape deck, and which can release both reels when it is placed on the tape deck so that the reels may be rotated during a sound recording or reproducing operation.

Another object of the invention is to provide a carrier of the just outlined characteristics which will maintain the reels at such distance from each other that the reels are automatically aligned with and may be placed onto the customary shafts on the tape deck.

A further object of the invention is to provide a carrier of the above described type which may at least partially release the reels in a fully automatic way when it is placed onto the tape deck.

An additional object of the invention is to provide a carrier for the reels of a sound recording and reproducing apparatus which supports and engages the reels in such a way that each reel may be separated therefrom and that the carrier does not in any way impede rotary movements of the reels on the tape deck.

With the above objects in view, the invention resides in the provision of a magnetic sound recording and reproducing apparatus which comprises a tape deck, a pair of spaced parallel shafts which extend above the tape deck, a tape reel removably mounted on each shaft, a carrier which non-rotatably supports the reels in a common plane at least when the reels are removed from the respective shafts, this carrier comprising a pair of articulately interconnected components each of which carries or comprises two spaced reel-engaging elements arranged in such a way that the elements of one component engage such portions of the respective reels which are located diametrically opposite the portions engaged by the elements of the other component, and actuating means provided on the carrier and/or on the tape deck for moving the elements away from the respective reels by causing a sliding, pivoting or other movement of one component with respect to the other component.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
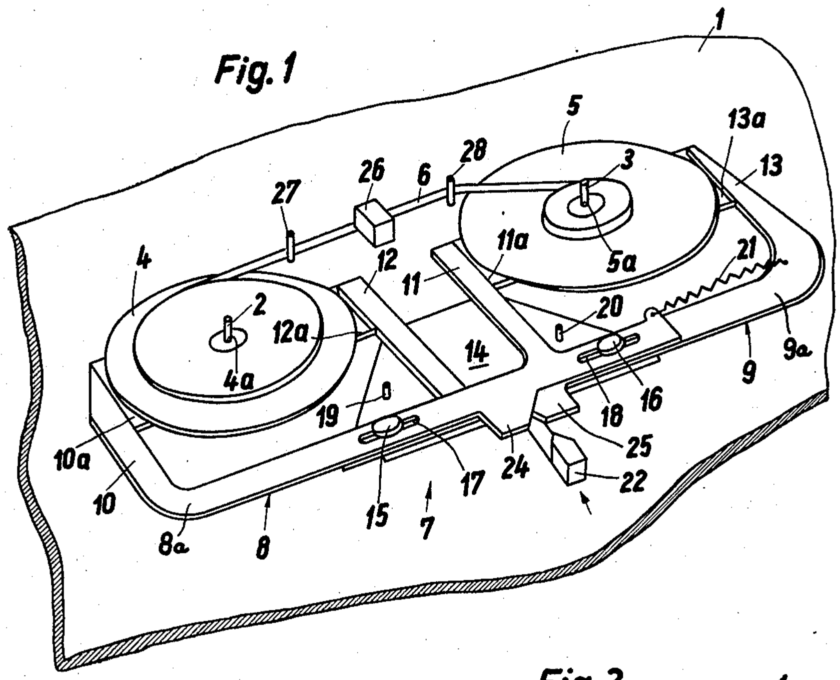
FIG. 1 is a perspective view of a reel carrier which is mounted on the deck of a magnetic tape recording and reproducing apparatus and which comprises two slidably connected U-shaped components.

Referring now in greater detail to the illustrated embodiments, and first to FIG. 1, there is shown the tape deck 1 of a magnetic sound recording and reproducing apparatus, hereinafter called tape recorder, which includes a pair of spaced parallel shafts 2, 3 projecting upwardly from the tape deck and supporting a pair of coplanar reels 4, 5 for a magnetic tape 6. The upper disks of the reels 4, 5 have been omitted for the sake of clarity.

The carrier 7 for the reels 4, 5 comprises a pair of unitary rigid U-shaped components 8, 9 which partially overlap each other. These components 8, 9 include supporting or body portions 8*a*, 9*a* whose arms 10, 11 and 12, 13 are respectively provided with reel-engaging elements in the form of concave brake liners 10*a*, 11*a* and 12*a*, 13*a*. As shown the elements 10*a*, 12*a* engage diametrically opposed peripheral portions of the reel 4, and the elements 11*a*, 13*a* engage diametrically opposed portions of the reel 5. The components 8, 9 which are movable relative to each other as units are slidably connected with each other and with a base plate 14 by means of two slide bolts 15, 16 which respectively extend through aligned slots 17, 18 formed in the overlapping webs of the components 8, 9. The bolts 15, 16 are secured to the base plate 14, and the latter is provided with a pair of apertures for retaining studs 19, 20 which are secured to and extend upwardly from the tape deck 1. The elements 10*a*, 12*a* and 11*a*, 13*a* are respectively biased into frictional engagement with the reels 4, 5 by a helical spring 21 which is connected to the webs of the components 8, 9 and which tends to move the arms 11, 12 away from each other. The arrangement is such that, when the shafts 2, 3 are introduced into the concentric bores 4*a*, 5*a* of the reels 4, 5, the studs 19, 20 automatically enter the apertures of the base plate 14 and the latter is thereby held against displacement with respect to the tape deck 1. The latter supports an actuating member 22 which is movable in a direction perpendicular to the plane passing through the axes of the shafts 2, 3 and whose pointed front end portion may enter between a pair of mutually inclined actuating projections 24, 25 respectively provided on the webs of the components 8, 9. Thus, when the actuating member 22 is moved in the direction indicated by the arrow, it engages the inclined faces of the projections 24, 25 and moves the components 8, 9 against the bias of the spring 21 so that the elements 10*a*–13*a* are moved away from the reels and that the reels are free to rotate together with or with respect to the shafts 2, 3. For example, the actuating member 22 may be moved by hand or automatically in response to mounting of the base plate 14 on the deck 1 so that the reels are automatically released at the beginning of a sound recording or reproducing operation. When the motor is arrested, the actuating member 22 returns to the position of FIG. 1 and the spring 21 automatically returns the elements 10*a*–13*a* into engagement with the reels so that the carrier 7 and the reels may be removed from the tape deck in order to be placed into storage or to be used in another tape recorder without any displacement of the reels and of the tape 6. It will be noted that since the elements 10*a*–13*a* engage diametrically opposed portions of the reels, the reels cannot be shifted in any direction with respect to each other so that the distance between the centers of their bores 4*a*, 5*a* remains unchanged as soon as and whenever the spring 21 is free to maintain the components 8, 9 in the position of FIG. 1, i.e. whenever the articulately connected components 8, 9 are free to slide along the bolts 15, 16 in response to the bias of the spring.

FIG. 1 further shows a magnetic head 26 and a pair of guide pins 27, 28 which are mounted on the tape deck 1. Of course, the median portion of the base plate 14 may be extended and the pins 27, 28 may be mounted on this plate if desired.

Figure 2:
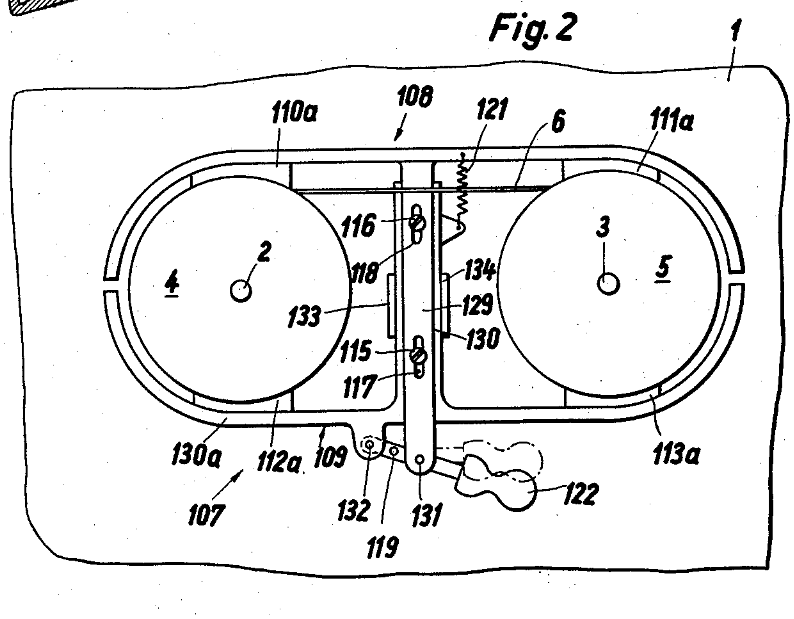
FIG. 2 is a top plan view of a slightly different carrier which comprises two slidably connected T-shaped components.

FIG. 2 illustrates a modified carrier 107 which comprises a pair of unitary rigid T-shaped components 108, 109 each of which includes a transverse or supporting portion provided with a pair of spaced reel-engaging elements or brake liners 110*a*, 111*a* and 112*a*, 113*a*. The legs 129, 130 of the components 108, 109 are disposed between the reels 4, 5 and overlap each other, and the overlapping leg 129 is provided with a pair of aligned elongated slots 117, 118 for bolts 115, 116 which are secured to the overlapped leg 130. The components 108, 109 are connected by a spring 121 which permenantly biases the elements 110*a*, 112*a* and 111*a*, 113*a* into frictional engagement with diametrically opposed portions of the reels 4, 5 respectively. It will be noted that the transverse portions of the components 108, 109 are disposed at opposite sides of the plane common to the shafts 2, 3.

In the embodiment of FIG. 2, the actuating means includes a lever 122 which is pivotally connected to the leg 129 by a pin 131 and which is also pivoted to the transverse portion 130*a* of the component 109 by a pin 132. Intermediate the pins 131, 132, the lever 125 is formed with an aperture for another part of the actuating means in the form of a retaining pin 119 which is secured to the tape deck 1. The overlapped leg 130 of the component 109 is slidably received between a pair of upstanding guide ribs 133, 134 which are secured to the tape deck so that the components 108, 109 are properly located on the tape deck once the shafts 2, 3 extend into the bores of the reels 4, 5, once the pin 119 extends into the aperture of the lever 122, and once the overlapped leg 130 is received between the guide ribs 133, 134. If the operator then desires to release the reels, he merely pivots the lever 122 about the retaining pin 119 whereby the elements 110*a*, 111*a* are moved away from the elements 112*a*, 113*a* and the reels are free to rotate about the axes of the shafts 2, 3. Means may be provided for holding the lever 122 in its phantom-line position in which the spring 121 is expanded and the reels are free to rotate. Before the reels are removed from the tape deck, the operator causes the lever 122 to return to the full-line position of FIG. 2 so that the elements 110*a*–113*a* again engage the reels and hold the same in coplanar relation against any movement with respect to each other. It will be noted that the components of my improved carrier may be slidably connected to each other without the help of a base plate and that the reel-engaging elements may be located adjacent to such points of the reels 4, 5 which are located in the common plane of the shafts 2, 3 (FIG. 1), or that the reel-engaging elements may be adjacent to such points of the reels which are located in two spaced planes which latter are parallel with each other and pass through the axes of the shafts 2, 3 (FIG. 2).

Figure 3:
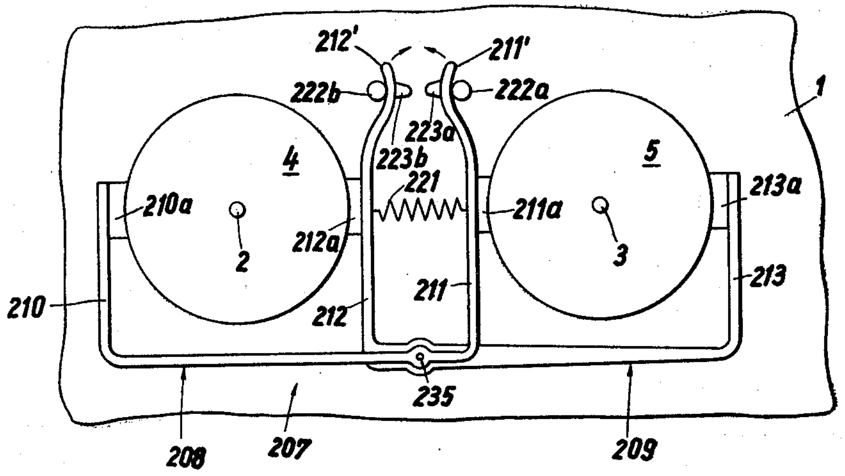
FIG. 3 is a top plan view of a modified carrier which comprises two pivotally connected U-shaped components.

Referring to FIG. 3, there is shown a carrier 207 comprising a pair of unitary integral U-shaped components 208, 209 whose supporting portions or webs are pivotally connected to each other by a pin 235. The arms 210, 211 and 212, 213 of these components are respectively provided with reel-engaging elements 210*a*, 211*a* and 212*a*, 213*a* and the arms 211, 212 are biased apart by a helical spring 221 which respectively maintains the elements 210*a*, 212*a* and 211*a*, 213*a* in frictional engagement with the reels 4 and 5. The arms 211, 212 are provided with arcuate extensions 211′, 212′ which are engaged by actuating members in the form of pins 222*a*, 222*b* mounted on the tape deck 1 and movable in the direction of arrows so as to pivot the components 208, 209 with respect to each other and to thereby move the elements 110*a*–113*a* away from the reels. The pins 222*a*, 222*b* are respectively slidable in elongated guide slots 223*a*, 223*b* formed in the tape deck 1.

Figure 4:
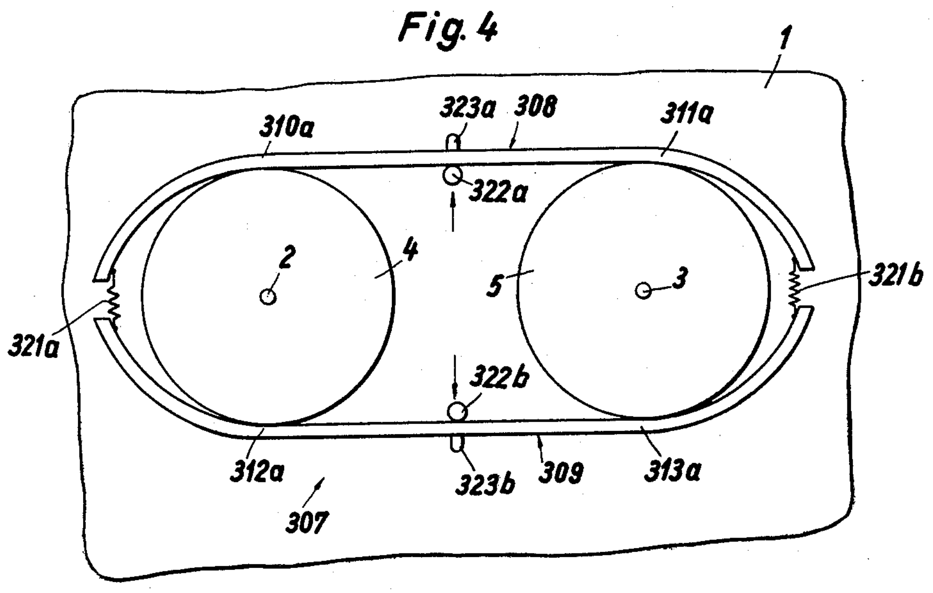
FIG. 4 is a top plan view of a carrier which comprises a pair of semielliptical components.

FIG. 4 illustrates a carrier 307 whose unitary rigid components 308, 309 are of semielliptical shape and are coupled by a pair of springs 321*a*, 321*b*. The portions 310*a*, 311*a* and 312*a*, 313*a* of these componets constitute the reel-engaging elements and are connected by supporting portions. The reel-engaging portions or elements respectively engage the reels 4, 5 in the same manner as shown in FIG. 2, and the tape deck 1 supports a pair of actuating pins 322*a*, 322*b* which are slidable in slots 323*a*, 323*b* and serve as a means for moving the components 308, 309 away from the reels. The components 308, 309 are disposed at opposite sides of the plane common to the shafts 2, 3.

Figure 5:
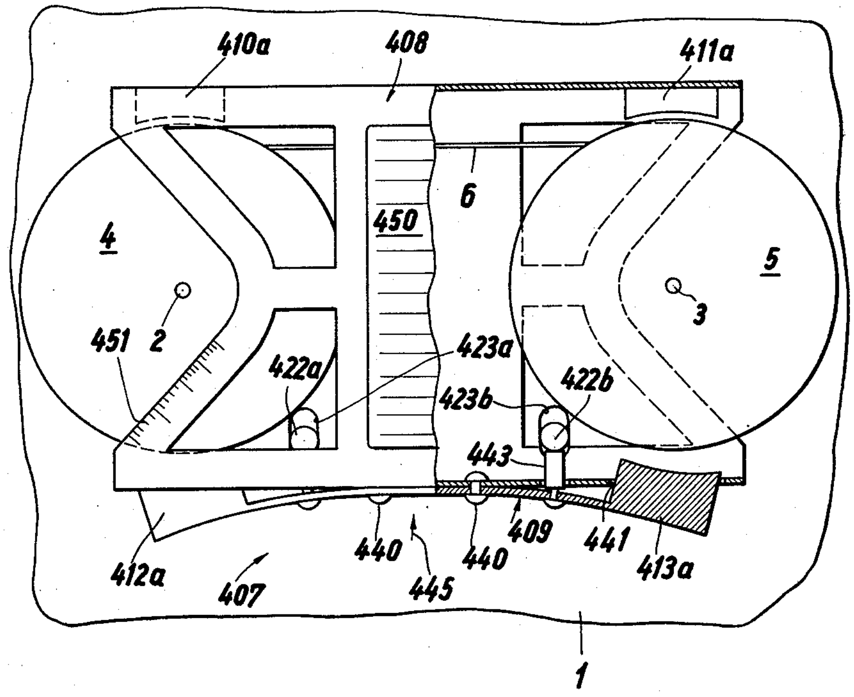
FIG. 5 is a top plan view of a carrier which comprises a cartridge and a resilient component.

Referring finally to FIG. 5, there is shown a carrier 407 which comprises a first unitary component in the form of a cartridge 408 and a resilient second unitary component in the form of a leaf spring 409 which latter is secured to the cartridge by a series of rivets 440. The component 408 comprises a pair of spaced internal reel-engaging elements in the form of brake liners 410*a*, 411*a*, mounted on the supporting or body portion of the component 408, while the supporting or body portion of the resilient component 409 carries a pair of spaced reel-engaging elements or liners 412*a*, 413*a* which extend through cutouts 441 provided in one end wall of the cartridge 408. Since the component 409 is elastic, it permanently tends to maintain the elements 410*a*, 412*a*, and 411*a*, 413*a* in engagement with the reels 4, 5, respectively. It will be noted that the elements 410*a*, 411*a* and 412*a*, 413*a* are disposed at opposite sides of the plane common to the shafts 2, 3 and that these elements engage diametrically opposed portions of the respective reels.

The actuating means for moving the elements 410*a*–413*a* away from the respective reels comprises a pair of pins 422*a*, 422*b* which are fixed to the tape deck 1 and which extend into elongated slots 423*a*, 423*b* of the cartridge 408 so as to abut against motion transmitting pins 443 secured to the resilient component 409. If a force is applied against the carrier 407 in the direction of the arrow 445, the cartridge 408 is automatically shifted to the position of FIG. 5 in which its elements 410*a*, 411*a* are respectively spaced from the reels 4, 5, and the pins 422*a*, 422*b* simultaneously deform the arms of the resilient component 409 so that the elements 412*a*, 413*a* are also compelled to move away from the respective reels. The carrier 407 then remains in such position during a sound recording or reproducing operation and its elements automatically reengage the reels as soon as the resilient component 409 is permitted to reassume its normal position in which its elements 412*a*, 413*a* are fully received in the interior of the cartridge 408 and engage the reels to simultaneously bias the reels against the elements 410*a*, 411*a*.

The central portion of the cartridge 408 may be provided with a panel 450 which is utilized for making a written memorandum of the matter recorded on the tape 6, and this cartridge may carry suitable graduations 451 which indicate to the operator how much tape is convoluted on the respective reel. The disks of the reels 4, 5 may consist of transparent material or they may be formed with suitably arranged perforations so that the observer can immediately determine how much tape is wound thereon.

It will be noted that I provide a novel carrier whose reel-engaging elements or liners are permanently biased into engagement with diametrically opposed portions of the respective reels at least when the carrier is removed from the tape deck. This insures that the distance, the inclination and the angular position of the reels with respect to each other remain unchanged and that, when the carrier is again placed on the deck, the tape will assume the same position with respect to the magnetic head or heads in which it was removed from the apparatus.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a tape recorder, in combination, a tape deck; a pair of spaced reel supporting shafts extending above said deck; a tape reel removably mounted on each shaft; a carrier for non-rotatably supporting said reels in a common plane at least when said reels are removed from the respective shafts, said carrier comprising a unitary rigid first and a unitary rigid second component each including a supporting portion and a pair of spaced reel-engaging elements which latter are carried by the respective supporting portion and one of which engages one of said reels and the other of which engages the other reel, said components being connected for movement relative to each other as units, said elements engaging diametrically opposed portions of the respective reels; and cooperating actuating means provided on said deck and on said carrier for moving said elements away from the respective reels.

2. In a tape recorder, in combination, a tape deck; a pair of spaced reel supporting shafts extending above said deck; a tape reel removably mounted on each of said shafts; a carrier for non-rotatably supporting said reels in coplanar relation at least when said reels are removed from the respective shafts, said carrier comprising a cartridge partially receiving said reels and including a pair of spaced reel-engaging elements rigidly mounted on said cartridge and disposed at one side of the plane common to said shafts, a resilient component secured to said cartridge and having a pair of spaced reel-engaging elements secured thereto, said last-mentioned pair of spaced reel-engaging elements being disposed at the other side of said plane and engaging said reels so as to bias the reels into frictional engagement with the elements of said cartridge, the elements of said resilient component and the elements of said cartridge engaging diametrically opposed portions of the respective reels; and cooperating actuating means provided on said deck and on said carrier for moving said elements away from the reels against the bias of said resilient component.

3. In a tape recorder, in combination, a tape deck; a pair of spaced reel supporting shafts extending above said deck; a tape reel removably mounted on each shaft; a carrier for non-rotatably supporting said reels in a common plane at least when said reels are removed from the respective shafts, said carrier comprising a first and a second U-shaped component each including a pair of spaced arms having reel-engaging elements one of which engages one of said reels and the other of which engages the other reel, said components having webs slidably connected with each other and said elements adjacent to diametrically opposed portions of the respective reels; resilient means operating between said components for biasing said elements into engagement with the respective reels; and cooperating actuating means provided on said deck and on said carrier for shifting said components with respect to each other against the bias of said resilient means so as to move said elements away from the respective reels.

4. In a tape recorder, in combination, a tape deck; a pair of spaced reel supporting shafts extending above said deck; a tape reel removably mounted on each shaft; a carrier for non-rotatably supporting said reels in coplanar relation at least when said reels are removed from the respective shafts, said carrier comprising a first and a second U-shaped component each including a pair of spaced arms having reel-engaging elements one of which engages one of said reels and the other of which engages the other reel, said components having webs pivotally connected with each other and said elements adjacent to diametrically opposed portions of the respective reels; resilient means connected with said components for permanently biasing said elements into engagement with the respective reels; and cooperating actuating means provided on said deck and on said carrier for pivoting said components with respect to each other against the bias of said resilient means so as to move said elements away from the respective reels.

5. In a tape recorder, in combination, a tape deck; a pair of spaced reel supporting shafts extending above said deck; a tape reel removably mounted on each shaft; a carrier for non-rotatably supporting said reels in a common plane at least when the reels are removed from the respective shafts, said carrier comprising a first and a second T-shaped component, said components having overlapping legs extending between said reels and each having a transversely extending portion one of which is disposed at one side and the other of which is disposed at the other side of the plane common to said shafts, each of said portions comprising a pair of spaced reel-engaging elements one of which is adapted to engage one of said reels and the other of which is adapted to engage the other reel, the elements of one of said portions disposed diametrically opposite the elements of the other of said portions; resilient means operating between said components for permanently biasing said elements into engagement with the respective reels; means slidably connecting said legs so that the elements of said components are movable toward and away from each other; and cooperating actuating means provided on said deck and on said carrier for shifting said components with respect to each other against the bias of said resilient means so as to move said elements away from the respective reels.

6. In a tape recorder, in combination, a tape deck; a pair of spaced reel supporting shafts extending above said deck; a tape reel removably mounted on each shaft; a carrier for non-rotatably supporting said reels in coplanar relation at least when said reels are removed from the respective shafts, said carrier comprising a unitary first component movable as a unit and disposed at one side of the plane common to said shafts and a unitary second component movable as a unit relative to said first component and disposed at the other side of said plane, each of said components having a pair of spaced reel-engaging portions one of which engages one of said reels and the other of which engages the other reel, said portions of said components engaging diametrically opposed portions of the respective reels; resilient means for connecting said components with each other and for permanently biasing said reel-engaging portions thereof into engagement with the respective reels; and actuating means provided on said deck for moving said components with respect to each other and against the bias of said resilient means so as to move said reel-engaging portions thereof away from the respective reels.

7. In a tape recorder, in combination, a tape deck; a pair of spaced reel supporting shafts extending above said deck; a tape reel removably mounted on each shaft; a carrier for non-rotatably supporting said reels in a common plane at least when said reels are removed from the respective shafts, said carrier comprising a unitary first and a unitary second component each including a supporting portion and a pair of spaced reel-engaging elements which latter are carried by the respective supporting portion and one of which engages one of said reels and the other of which engages the other reel, said components being connected with each other and said elements engaging diametrically opposed portions of the respective reels; and means for moving said elements away from the respective reels.

References Cited in the file of this patent

UNITED STATES PATENTS

| | | |
|---|---|---|
| 2,391,724 | Martin et al. | Dec. 25, 1945 |
| 2,652,910 | Godeck | Sept. 22, 1953 |
| 2,652,988 | Godeck | Sept. 22, 1953 |